(12) United States Patent
Kim et al.

(10) Patent No.: US 7,976,977 B2
(45) Date of Patent: Jul. 12, 2011

(54) ELECTROCHEMICAL DEVICE WITH ALTERNATIVE SEPARATOR SYSTEM

(75) Inventors: Je Young Kim, Daejeon (KR); Pil Kyu Park, Daejeon (KR); Soonho Ahn, Daejeon (KR)

(73) Assignee: LG Chem, Ltd. (KR)

( * ) Notice: Subject to any disclaimer, the term of this patent is extended or adjusted under 35 U.S.C. 154(b) by 1349 days.

(21) Appl. No.: 11/498,549

(22) Filed: Aug. 3, 2006

(65) Prior Publication Data

US 2007/0184350 A1  Aug. 9, 2007

(30) Foreign Application Priority Data

Aug. 16, 2005  (KR) .................. 10-2005-0074667

(51) Int. Cl.
*H01M 2/16* (2006.01)
*H01M 10/40* (2006.01)

(52) U.S. Cl. ............... 429/144; 429/153; 429/176
(58) Field of Classification Search .................. None
See application file for complete search history.

(56) References Cited

U.S. PATENT DOCUMENTS

| | | | |
|---|---|---|---|
| 6,709,785 B2 * | 3/2004 | Lee et al. | 429/153 |
| 2004/0062986 A1 * | 4/2004 | Aamodt et al. | 429/181 |
| 2004/0229118 A1 * | 11/2004 | Wensley et al. | 429/162 |

FOREIGN PATENT DOCUMENTS

| | | |
|---|---|---|
| JP | 08-153542 | 11/1996 |
| JP | 2003-243037 | 8/2003 |
| KR | 1020010082059 | 8/2001 |
| KR | 1020010082060 | 8/2001 |

* cited by examiner

*Primary Examiner* — John S Maples
(74) *Attorney, Agent, or Firm* — Cantor Colburn LLP

(57) ABSTRACT

Provided is an electrochemical device comprising multi-stacked unit cells of full cells or bicells and a separation film disposed therebetween, whereby the separation film and separators are alternately stacked between electrode layers with an opposite polarity. Herein, as the separation film is formed of a material having a higher thermal shrinkage rate than that of the separator, the thermal stability of the device can be secured by stable induction of shutdown via thermal behavior of the separation film, without causing short-circuiting due to thermal shrinkage of the separator even when a temperature of a battery suddenly rises by internal or external factors.

11 Claims, 2 Drawing Sheets

ELECTROCHEMICAL DEVICE WITH ALTERNATIVE SEPARATOR SYSTEM

This application claims priority to Korean Patent Application No. 10-2005-0074667 filed on Aug. 16, 2005, and all the benefits accruing therefrom under 35 U.S.C. §119, the content of which in its entirety is herein incorporated by reference.

FIELD OF THE INVENTION

The present invention relates to an electrochemical device with an alternate separator system. More specifically, the present invention relates to an electrochemical device having improved stability via an alternately stacked structure of separator members at a regular interval, wherein the separator members exhibit different thermal behavior due to difference of a thermal shrinkage rate between separators of unit cells and a separation film which is disposed between unit cells.

BACKGROUND OF THE INVENTION

In recent years, as a great deal of interest has been increasingly directed to energy storage technology, efforts and attempts to research and develop batteries capable of implementing such technology have been increasingly undertaken. In this respect, the field of electrochemical devices has been receiving a great deal of attention, and in particular, a lot of interest has been focused on the development of rechargeable secondary batteries.

The secondary battery is a battery malting use of electrochemical reaction occurring between electrodes and electrolyte, upon inserting a cathode and anode into an electrolyte and connecting the cathode with the anode. Unlike a conventional primary battery, the secondary battery is a rechargeable battery having repeated usability by recharging energy consumed in electric/electronic products using a battery charger, and therefore is undergoing rapid growth in conjunction with wireless electric/electronic products.

Such secondary batteries may be classified into nickel-cadmium (Ni—Cds) batteries, nickel-hydrogen (Ni—$H_2$) batteries, lithium ion batteries and lithium polymer batteries depending upon kinds of cathode, anode and electrolyte materials to be used, and may also be divided into cylindrical-, square- and pouch-shaped batteries, depending upon morphology thereof.

Materials (such as cathode/anode active materials, binders, electrolytes and current collectors) utilized in the secondary batteries are electrochemically safe under normal operating conditions, for example operating voltage of 2.5 to 4.3 V, operating temperature of −20 to 100° C., and electrically insulated state between the cathode and anode. However, when batteries are subjected to overcharging, heating or short-circuiting by internal or external factors, structural components of the batteries undergo abnormal chemical reactions, thereby resulting in increased internal temperature of the battery and generation of gases. Gases thus generated lead to increased internal pressure of the secondary battery which further accelerates elevation of the battery temperature and gas generation, consequently causing explosion or ignition of the battery.

Therefore, an essential requirement, which should be considered for the development of secondary batteries, is to secure the battery safety. As attempts to secure the battery safety, there may be mentioned a method of disposing safety elements externally of the cell and a method of using materials inside the cell. The former method involves use of elements such as a Positive Temperature Coefficient (PTC) device using change of temperatures, a protection circuit using changes of voltage, and Safety Vent using changes in internal pressure of the battery, whereas the latter method involves incorporation of materials which can undergo physical, chemical or electrochemical changes in response to changes of the internal temperature or voltage of the cell, or blocking of ion transfer by melting of the separator. As specific examples of the latter method, mention may be made of a method using shutdown functions of the separator per se, a method involving incorporation of additives into the electrolyte, a method using coating materials coated on electrode constituent materials, electrodes or separators, and the like. These materials incorporated are designed to exhibit sensitive and rapid response to changes in the internal temperature or voltage of the cell.

Safety elements disposed externally of the cell exert their functions by using changes of temperature, voltage or battery internal pressure and therefore ensure accurate shutdown, but suffer from disadvantages of high costs. On the other hand, the methods of improving safety via incorporation of desired additive materials inside the cell have advantages of simple and convenient installation due to inclusion of the additive materials in the inside of the cell, but suffer from the problems associated with incapability to ensure reliable safety and therefore are not used alone as a measure to offer the battery safety.

As an attempt to achieve the battery safety via changes of the separator at a high temperature, Japanese Patent Publication Laid-Open Nos. 1996-153542 and 2003-243037 disclose a lithium ion battery having improved safety, wherein a cathode and an anode are constructed such that two electrodes are arranged opposite to each other with a separator having a relatively low-melting point therebetween, under no application of an electrode active material to at least one part of the cathode and anode, and therefore the cathode and anode are short-circuited by primary melting of the separator when the internal temperature of the battery elevates. However, fabrication of the battery having such a specific electrode structure suffers from shortcomings such as low productivity, melting of the separator even at an acceptable operating temperature of the battery, thereby rendering the battery useless, and difficulty to induce desired short-circuiting due to adhering of the melted separator to electrodes, thus limiting achievement of the battery safety.

As such, there remains an urgent need in the art for the development of a more efficient technique capable of ensuring the battery safety via the use of the separator.

Meanwhile, due to a small volume, electrochemical devices having a sequential and multi-stacked structure, composed of cathode plates to which cathode active materials are applied, porous separators through which electrolytes can migrate, and anode plates to which anode active materials are applied, are increasingly in demand in compliance with a trend toward miniaturization of electronic products. As a preferred example of such a stacked electrochemical device, Korean Patent Laid-Open Publication Nos. 2001-82059 and 2001-82060, assigned to the present applicant, disclose a stacked and folded electrochemical device. According to theses arts, the stacked and folded electrochemical device has a structure including multi-stacked unit cells of bicells or full cells and a porous separation film interposed between each stacked unit cell, wherein the porous separation film has a unit length which is determined to wrap the unit cells and folds inward every unit length to wrap each unit cell continuously starting from the central unit cell to the outermost unit cell, or wherein the porous separation film has a unit length which is determined to wrap the unit cells and folds outward every unit length to fold each unit cell in a Z-shape continuously starting from the unit cell of a first position to the unit cell of the last position while the remaining separation film wraps outer portions of the stacked cells.

Such a stacked and folded electrochemical device can be easily manufactured, has a structure which is capable of providing efficient use of space, and can maximize the content of the electrode active material so that a highly integrated battery can be implemented.

In such stacked and folded electrochemical devices, the separator, which is one of unit cell constituent elements, and the separation film, which is interposed between unit cells in a particular manner, exert their shutdown functions by thermal behavior at high temperatures, as discussed hereinbefore. However, the separator in the stacked electrochemical cell is likely to cause short-circuiting by shrinkage of the separator per se, before the desired shutdown functions thereof are exerted at high temperatures. Further, fabrication of the porous separator or separation film via uniaxial orientation or biaxial orientation leads to higher probability of short-circuiting due to shrinkage of the separator or separation film.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have discovered, as will be described hereinafter, the facts that, in fabrication of a stacked and folded electrochemical device comprising multi-stacked unit cells of full cells or bicells and a separation film which is interposed between stacked unit cells and is allowed to wrap each unit cell, when the separators inside the unit cells are formed of a porous material having substantially no thermal shrinkage, and the separation film interposed between the stacked unit cells is formed of a porous material having a relatively high-thermal shrinkage rate, it is possible to prevent short-circuiting due to thermal shrinkage of the separator at a high temperature, while it is also possible to improve the battery safety via shutdown action of the separation film. The present invention has been completed based on these findings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

In accordance with an aspect of the present invention, the above and other objects can be accomplished by the provision of a stacked and folded electrochemical device comprising multi-stacked unit cells of full cells or bicells and a separation film interposed therebetween and wrapping them, wherein the separators of the unit cells are formed of a porous material having a low-thermal shrinkage rate and the separation film is formed of a porous material having a relatively high-thermal shrinkage rate.

Due to inclusion of the low-thermal shrinkage separators in the unit cells, the electrochemical device according to the present invention can prevent short-circuiting due to thermal shrinkage of the separator even at a high temperature, i.e., short-circuiting due to contact of the cathode and anode arranged opposite to each other with the separator therebetween, resulting from thermal shrinkage of the separator. Further, the high-temperature shutdown action of the electrochemical device according to the present invention can be achieved by the separation film interposed between the stacked unit cells. Therefore, even when the temperature of the device suddenly rises, it is possible to prevent explosion or ignition of the battery by stably blocking migration of electrolytes at an intended temperature via the action of the separation film.

As used herein, the full cell refers to an electrode assembly wherein electrodes positioned at both ends of the assembly are stacked to form the cathode and anode, respectively, as shown in the structure of cathode/separator/anode or cathode/separator/anode/separator/cathode/separator/anode.

On the other hand, the bicell refers to an electrode assembly wherein electrodes positioned at both ends of the assembly are stacked to form the identical electrodes with the same polarity, and is classified into a cathode-type bicell consisting of cathode/separator/anode/separator/cathode and an anode-type bicell consisting of anode/separator/cathode/separator/anode.

Figure 1:
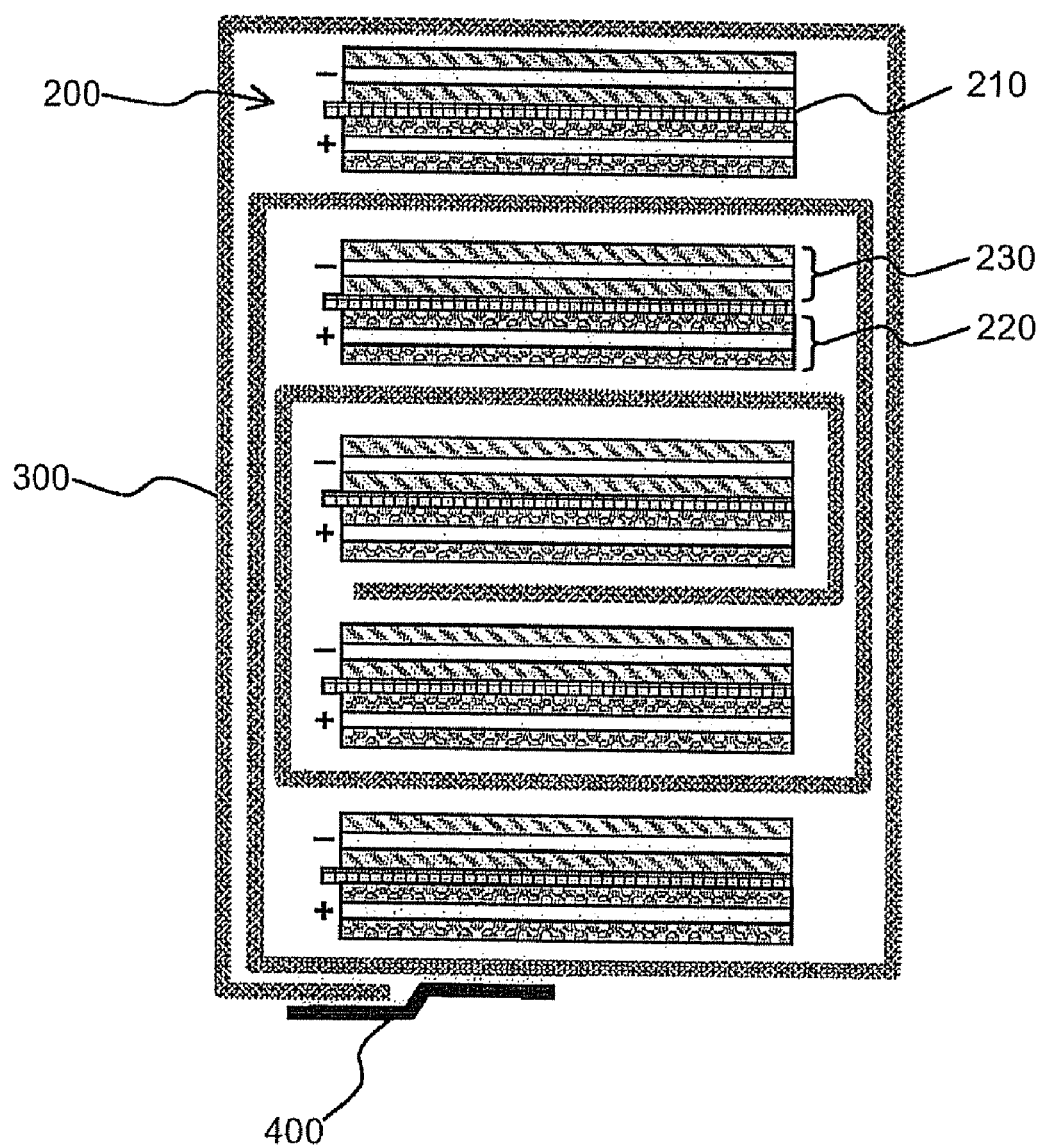
FIG. 1 is a schematic view of a stacked and folded electrochemical device according to one embodiment of the present invention.
Figure 2:
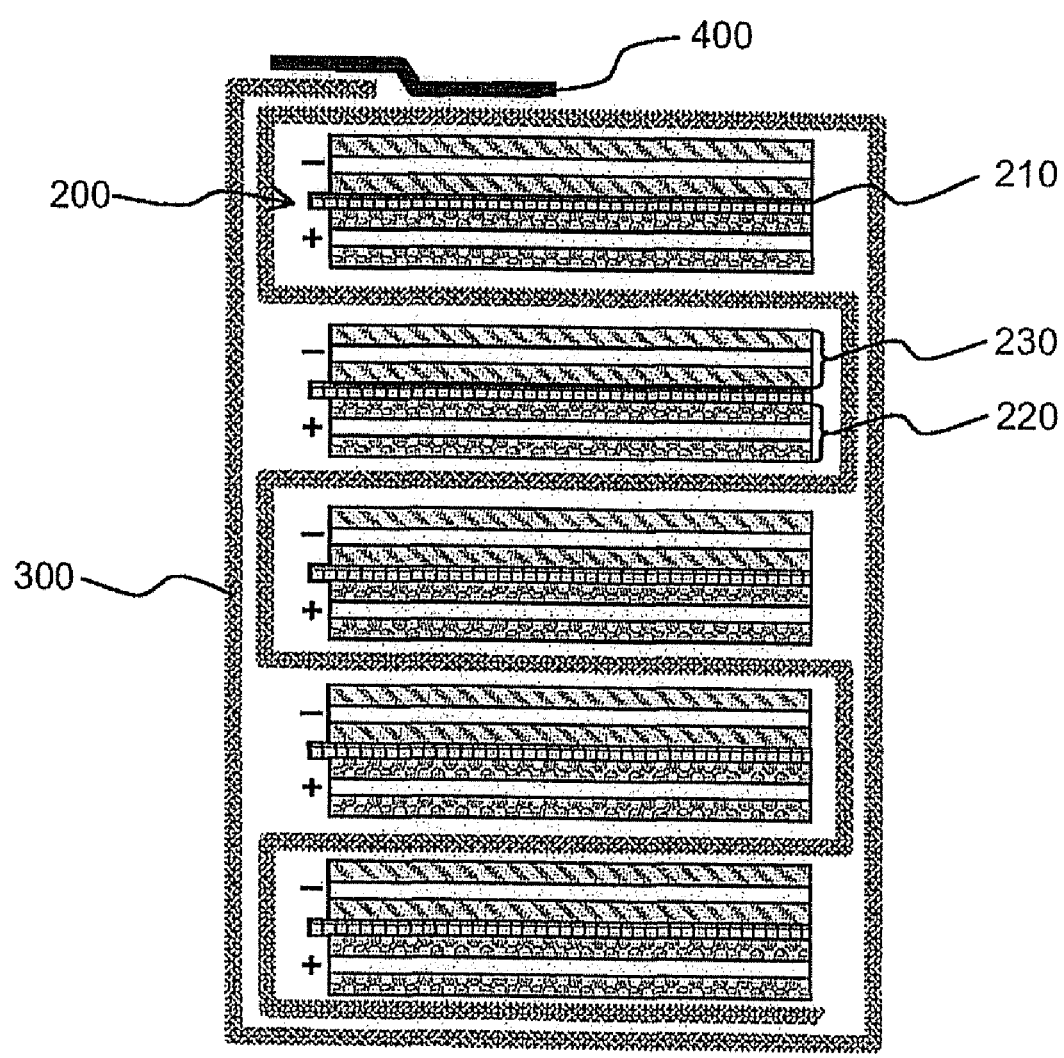
FIG. 2 is a schematic view of a stacked and folded electrochemical device according to another embodiment of the present invention.

As examples of the stacked and folded electrochemical device having the above-mentioned structure, mention may be made of the electrochemical device disclosed in Korean Patent Laid-Open Publication Nos. 2001-82059 and 2001-82060, assigned to the present applicant. FIGS. 1 and 2 schematically show structures of electrochemical devices which can be applied to the present invention.

First, referring to FIG. 1, an electrochemical device 100 has a structure including multi-stacked unit cells 200 of full cells or bicells and a porous separation film 300 interposed between each stacked unit cell, wherein the porous separation film 300 has a unit length which is determined to wrap the unit cells 200 and folds inward every unit length to wrap each unit cell 200 continuously starting from the central unit cell 200 to the outermost unit cell 200, and a tape 400 is attached to the outermost end of the separation film 300.

Referring to FIG. 2, an electrochemical device 110 has a structure including multi-stacked unit cells 200 of full cells or bicells and a porous separation film 300 interposed between each stacked unit cell, wherein the porous separation film 300 has a unit length which is determined to wrap the unit cells 200 and folds outward every unit length to fold each unit cell 200 in a Z-shape continuously starting from the unit cell 200 of a first position to the unit cell 200 of the last position while the remaining separation film 300 wraps outer portions of the stacked unit cells 200, and a tape 400 is attached to the outermost end of the porous separation film 300.

Further details of the electrochemical device are disclosed in Korean Patent Laid-Open Publication Nos. 2001-82059 and 2001-82060, the disclosures of which are incorporated by reference in their entireties.

A separator 210 is interposed between a cathode 220 and an anode 230 of each unit cell 200, and is formed of an insulating thin film having high ion permeability and mechanical strength. The separator typically has a pore diameter of 0.01 to 10 μm and a thickness of 5 to 300 μm. According to the present invention, the separator 210 included in the unit cell 200 is characterized by a low-thermal shrinkage rate. Preferably, the separator 210 undergoes no thermal shrinkage until at least 150° C. Preferred examples of materials for the separator 210 may be ceramic materials or engineering plastics having a melting point of more than 200° C.

Specific examples of the ceramic materials may include, but are not limited to, $Pb(Zr,Ti)O_3$, $Pb_{1-x}La_xZr_{1-y}Ti_yO_3$ wherein x and y are independently in the range of 0 to 1, $PB(Mg_3Nb_{2/3})O_3$—$PbTiO_3$, $BaTiO_3$, $HfO_2$, $SrTiO_3$, $TiO_2$, $SiO_2$, $Al_2O_3$, $ZrO_2$, $SnO_2$, $CeO_2$, $MgO$, $CaO$, $Y_2O_3$ and any combination thereof.

Specific examples of the engineering plastics may include, but are not limited to, polyester, polysulfone, polyimide, polyamide, polyacetal and any combination thereof.

Fabrication of the ceramic separator may be carried out as follows. The above-mentioned ceramic particles are homogeneously dispersed in a polymer binder solution to thereby prepare a slurry. The resulting slurry is then coated on a supporting material and dried to fabricate a separator. Here, as the supporting material conventionally used, mention may be made of porous non-woven films such as PET and nylon, or conventional polyolefin separator. As the polymer binder used herein, mention may be made of binders such as polyvinylidene fluoride, polyacrylonitrile and polyvinyl alcohols, which have been used in fabrication of the conventional separators. Pore size and porosity of the separator are determined upon kinds of ceramic materials, kinds of polymers and ratios thereof.

Further, the separator using engineering plastics exhibiting substantially no thermal shrinkage until about 150° C. may be fabricated by calendaring or spinning, instead of using conventional orientation.

The cathode 220 is, for example, fabricated by applying a mixture of the cathode active material, a conductive material and a binder to a cathode current collector, followed by drying. If desired, other fillers may be further added to the above mixture.

Examples of the cathode active material that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$) or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$ or composite oxides formed by any combination thereof, which are based on lithium intercalation materials as a main component.

The cathode current collector is generally fabricated to have a thickness of 3 to 500 μm. There is no particular limit to the cathode current collector, so long as it has high conductivity without causing chemical changes in the fabricated battery. As examples of the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

The conductive material is usually added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive oxides such as titanium oxide; and polyphenylene derivatives.

The binder is a component assisting in binding between the active material and conductive material, and in binding with the current collector. The binder utilized in the present invention is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode 230 is fabricated by applying anode materials to an anode current collector, followed by drying. If necessary, other components, as described above, may be further added.

The anode current collector is generally fabricated to have a thickness of 3 to 500 μm. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated to form fine irregularities on the surface thereof so as to enhance adhesion to the anode active material. In addition, the anode current collector may take various forms including films, sheets, foils, nets, porous structures, foams and non-woven fabrics.

As examples of the anode materials utilizable in the present invention, mention may be made of carbon such as non-graphitizing carbon and graphite based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, Group I, Group II and Group III elements of the Periodic Table of the Elements, halogen atoms; $0 < x \leq 1$; $1 \leq y \leq 3$; and $1 \leq z \leq 8$); lithium metals; lithium alloys; silicon based alloys; tin based alloys; oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

Even though the separation film 300 interposed between each stacked unit cell 200 is also an insulating thin film having high ion permeability and mechanical strength, this thin film in the present invention is designated as the separation film 300 in order to distinguish from the separator 210 included in the unit cell 200.

The separation film has a relatively higher thermal shrinkage rate, as compared to the separator of the unit cell. As the separation film, the separators commonly used in the art may be employed. Specific examples of the separation film may include, but are not limited to, polyolefin resins such as polyethylene and polypropylene, and copolymers and blends thereof, which are materials containing fine pores through which cations such as lithium ions can migrate.

The separation film exerts shutdown functions by thermal behavior of the separation film material at a temperature of preferably 100 to 150° C., more preferably 120 to 140° C. If the shutdown-operating temperature of the separation film is excessively low, short-circuiting may occur even under normal operating conditions of the battery. If the shutdown-operating temperature of the separation film is excessively high, the temperature of the battery is undesirably excessively elevated and therefore the safety of the battery cannot be substantially ensured.

The thermal shrinkage temperature and thermal shrinkage rate of the separator may be determined depending upon various factors such as kinds of separator materials, fabrication methods, and processing methods and conditions. For example, a polyethylene separator undergoes shrinkage at a lower temperature, as compared to a polypropylene separator. In addition, even though the separators are made of the same material, they may exhibit differences in the thermal shrinkage rate depending upon a degree of elongation applied during a manufacturing process of the separator. Further, a thinner separator may have a higher thermal shrinkage rate, as compared to a relatively thicker separator.

Preferably, the separation film may employ a porous material uniaxially oriented in the folding direction, such that thermal shrinkage tales place only in the folding direction. Since the folding direction in the separation film corresponds to a direction of wrapping the unit cells, it is possible to prevent short-circuiting due to electrode-electrode contact, even though thermal shrinkage takes place at a high temperature. Whereas, occurrence of thermal shrinkage in the direction vertical to the folding direction may undesirably result in short-circuiting between electrodes.

The electrochemical device of the present invention is preferably a lithium secondary battery wherein a lithium salt-containing, non-aqueous electrolyte is contained in the above-mentioned electrode structure.

The lithium salt-containing, non-aqueous electrolyte is composed of a non-aqueous electrolyte and lithium. As the non-aqueous electrolyte, a non-aqueous electrolytic solution, solid electrolyte and inorganic solid electrolyte may be utilized.

As the non-aqueous electrolytic solution that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymer, poly agitation lysine, polyester sulfide, polyvinyl alcohol, poly(vinylidene fluoride), and polymers containing ionic dissociation groups.

As examples of the inorganic solid electrolyte utilized in the present invention, mention may be made of nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

Further, the present invention provides an electrochemical device pack comprising one or more electrochemical devices as mentioned above.

In the electrochemical device pack, the electrochemical devices may be connected in a serial or parallel manner.

EXAMPLES

Now, the present invention will be described in more detail with reference to the following examples. These examples are provided only for illustrating the present invention and should not be construed as limiting the scope and spirit of the present invention.

Example 1

A separator interposed in a unit cell was fabricated by coating a ceramic material on a non-woven supporting material. The separator undergoes no thermal shrinkage until 150° C.

A cathode was fabricated by coating a slurry of a commonly known lithium cobalt oxide, PVDF and a conductive material on an aluminum current collector.

An anode was fabricated by coating a slurry of a commonly known graphite, PVDF and a conductive material on a copper current collector.

Then, the separator was interposed between the anode and cathode to fabricate a full cell.

Using the full cells thus fabricated, an electrochemical device, as shown in FIG. 1, was fabricated with reference to the method disclosed in Korean Patent Laid-Open Publication No. 2001-82059. A polyethylene-based porous separation film was used as a separation film. This film can exert shutdown functions at 130° C.

Comparative Example 1

A stacked and folded electrochemical device, as shown in FIG. 1, was fabricated in the same manner as in Example 1, except that a separator made of a material identical to that of a separation film was used.

Experimental Example 1

Lithium ion secondary batteries were fabricated by injection of electrolytes into electrochemical devices of Example 1 and Comparative Example 1, followed by sealing.

Upon performing overcharge and high-temperature exposure experiments for the batteries thus fabricated, it was confirmed that Example 1 using an alternately-stacked separator structure exhibits improved safety of the battery, as compared to Comparative Example 1.

INDUSTRIAL APPLICABILITY

As apparent from the above description, an electrochemical device according to the present invention can ensure thermal stability thereof, by stable induction of shutdown via thermal behavior of a separation film, without causing short-circuiting due to thermal shrinkage of a separator even when a temperature of a battery suddenly rises by internal or external factors.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stacked and folded electrochemical device comprising:
   multi-stacked unit cells of full cells or bicells; and
   a separation film interposed between the stacked unit cells and wrapping the stacked unit cells in a folding direction,
   wherein
   separators of the unit cells are formed of a porous material having a low-thermal shrinkage rate, and the separators exhibit no thermal shrinkage until at least 150° C.; and
   the separation film is formed of a porous material having a relatively high-thermal shrinkage rate, and the separation film exerts shutdown functions by thermal behavior thereof at a temperature of 100 to 150° C., and
   the separation film is formed of a porous material uniaxially oriented in the folding direction, such that thermal shrinkage takes place only in the folding direction.

2. The electrochemical device according to claim 1, wherein the porous separation film has a unit length which wraps the unit cells and folds inward every unit length to wrap each unit cell continuously starting from the central unit cell to the outermost unit cell.

3. The electrochemical device according to claim 1, wherein the device has a structure including multi-stacked unit cells of full cells or bicells and a porous separation film interposed therebetween, wherein the porous separation film has a unit length which is determined to wrap the unit cells and folds outward every unit length to fold each unit cell in a Z-shape continuously starting from the unit cell of a first position to the unit cell of the last position while the remaining separation film wraps outer portions of the stacked unit cells.

4. The electrochemical device according to claim 1, wherein the separator is formed of a ceramic material or an engineering plastic having a melting point of more than 200° C.

5. The electrochemical device according to claim 4, wherein the ceramic material is selected from the group consisting of $Pb(Zr,Ti)O_3$, $Pb_{1-x}La_xZr_{1-y}Ti_yO_3$ wherein x and y are independently in the range of 0 to 1, $PB(Mg_3Nb_{2/3})O_3$—$PbTiO_3$, $BaTiO_3$, $HfO_2$, $SrTiO_3$, $TiO_2$, $SiO_2$, $Al_2O_3$, $ZrO_2$, $SnO_2$, $CeO_2$, $MgO$, $CaO$, $Y_2O_3$ and any combination thereof.

6. The device according to claim 4, wherein the engineering plastic is selected from the group consisting of polyester, polysulfone, polyimide, polyamide, polyacetal and any combination thereof.

7. The electrochemical device according to claim 1, wherein the separation film exerts shutdown functions by thermal behavior thereof at a temperature of 120 to 140° C.

8. The electrochemical device according to claim 1, wherein the separation film is formed of a polyolefin resin, or a copolymer or blend thereof.

9. The electrochemical device according to claim 1, wherein the device is a lithium secondary battery.

10. An electrochemical device pack comprising one or more electrochemical devices of claim 1.

11. The electrochemical device pack according to claim 10, wherein the electrochemical devices are connected in a serial or parallel manner.

* * * * *